(12) United States Patent
Lam et al.

(10) Patent No.: US 6,449,049 B1
(45) Date of Patent: Sep. 10, 2002

(54) PROFILING OF ASPHERIC SURFACES USING LIQUID CRYSTAL COMPENSATORY INTERFEROMETRY

(75) Inventors: Yee Loy Lam; Zhisheng Yun; Yan Zhou; Siu Chung Tam, all of Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 09/540,653

(22) Filed: Mar. 31, 2000

(51) Int. Cl.⁷ .................................. G01B 9/02
(52) U.S. Cl. ....................................... 356/515
(58) Field of Search ................. 356/489, 495, 356/513, 515

(56) References Cited

U.S. PATENT DOCUMENTS

| | | |
|---|---|---|
| 4,639,139 A | 1/1987 | Wyant et al. |
| 4,639,604 A | 1/1987 | Tenjinbayashi et al. |
| 4,743,117 A | 5/1988 | Kitabayashi et al. |
| 4,818,108 A | 4/1989 | Eppinger et al. |
| 5,164,750 A | 11/1992 | Adachi et al. |
| 5,245,402 A | 9/1993 | Adachi et al. |
| 5,298,971 A | 3/1994 | Huang et al. |
| 5,410,408 A | 4/1995 | Evans et al. |
| 5,559,630 A * | 9/1996 | Ho et al. ............... 359/371 |
| 5,737,079 A | 4/1998 | Burge et al. |

OTHER PUBLICATIONS

Opt. Eng. Yun et al., Apr. 1999, 650–654.
Opt. Eng. Yun et al., Apr. 1998, 1364–1367.
Opt. Eng. Melozzi, et al., May 1993, 1073–1079.
Proc. SPIE Wyant, 1987, 19–39.
Principle of Optics, Born et al., 1997, 694–702.
Appl. Opt., Kwon, et al., Jun. 1980, 1862–1869.
Optical Shop Testing, pp. 439–458; Malacara, No date.
Optical Electronics in Modern Communications, pp. 13–17; Yariv, No Date.
Appl. Opt. Wyant, Sep. 1971, 2113–2118.

* cited by examiner

*Primary Examiner*—Samuel A. Turner
(74) *Attorney, Agent, or Firm*—Baker Botts LLP

(57) ABSTRACT

A method for sensing and analyzing topographic properties of an aspheric test element is disclosed. The principle of the measurement technique is to immerse the element under test into a container filled with liquid crystal. A polarized plane wave passes through front and back precisely processed glass plates of the container sandwiched between a polarizer and an analyzer. The two side plates are not transited by the plane wave of light but are deposited with conductive layers in order to generate an electrical field between them. This DC (direct current) external electrical field is supplied to help to align the molecular direction of the liquid crystal. In a thus-induced desired configuration, the molecular direction of liquid crystal is aligned to be perpendicular to the incident plane wave front. As the plane light wave propagates through the liquid crystal in the container, it will be divided into ordinary and extraordinary beams. These two beams will create interference behind the analyzer. In the presence of the aspheric optical element under test, which is not a uniaxial crystal, a compensatory interferogram will be formed. Analysis of the interferogram will allow the user to determine the topographic surface profile of the aspheric element under test.

15 Claims, 2 Drawing Sheets

PROFILING OF ASPHERIC SURFACES USING LIQUID CRYSTAL COMPENSATORY INTERFEROMETRY

BACKGROUND OF INVENTION

1. Field of the Invention

The present invention relates to a novel optical arrangement for performing testing of an aspheric surface, viz., a surface that departs substantially from a spherical surface.

2. Description of the Prior Art

With technological progress in processing optical elements, more and more aspheric surfaces have been developed in optical systems for the reduction of size and weight and for the enhancement of the quality of the imaging optical systems. Consequently, the need to precisely test topographic and other properties of an aspheric surface has become very important.

Methods for testing aspheric surfaces can be classified into two categories: surface profilometric methods and optical interferometric methods. Traditional profilometric measurements use probes that contact the surfaces of the elements under test ("EUT"). These methods are time consuming and their accuracy is limited to lines that are traced on the surfaces of the EUT. Since some of the test element surfaces are delicate and can be scratched by the probes, interferometry is a better choice in testing most of these precision optical components.

Well-known interferometric methods include shearing interferometry, high density array interferometry, sub-Nyquist analysis method, long wavelength interferometry, two wavelength holography, computer generated holography, and multiple annular interferogram technique, etc. For a comprehensive understanding of these methods, interested readers can refer to technical paper by James C. Wyant, "Interferometric testing of aspheric surfaces, "Proc. SPIE 816, 616–636 (1987).

A drawback of conventional interferometry techniques when applied to testing aspheric surfaces is that the fringes in an interference pattern are in general too dense to be analyzed. Although null optics testing techniques, such as reflective and computer generated hologram null optics, and various non-null testing techniques, such as lateral shear interferometry, long wavelength interferometry and two wavelength holography, can be used to overcome this drawback, it would still be attractive to develop a simpler, cheaper and easier method to handle the testing.

SUMMARY OF THE INVENTION

It is therefore a primary object of the present invention to provide a new testing method to measure the profile of an aspheric surface. The test procedure involves immersing the aspheric EUT in a container of liquid crystal to produce interference patterns with a fringe density suitable for automated analysis.

It is another object of the present invention to provide a cheap, simple and nondestructive technique to test aspheric surfaces.

In accordance with the objects of the present invention, there is provided a liquid compensatory interferometric technique to achieve the testing and measurement. The technique is provided with a container that is filled with an index matching liquid crystal and sandwiched between a polarizer and an analyzer. An externally applied direct current (DC) voltage source generates an electric field which would orientate the liquid crystal molecular directions during the test. When a collimated laser beam passes through the container, it will be divided into ordinary and extraordinary beams (i.e. the orthogonally polarized o-rays and e-rays in optics terminology). As the aspheric EUT is not a uniaxial crystal, the interferogram formed by the analyzer behind the container will bear the information on the aspheric surface profile. After analyzing the interferogram, the user can obtain the profile of the aspheric EUT.

DETAILED DESCRIPTION OF THE INVENTION

Figure 1:
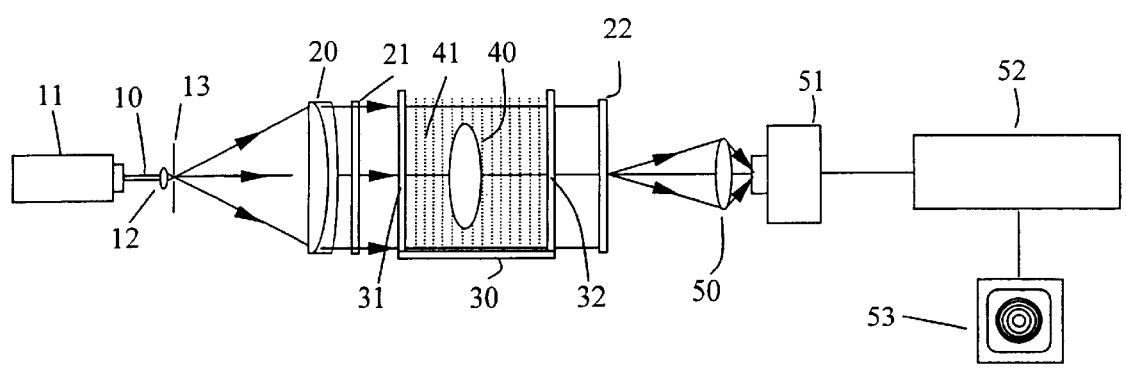
FIG. 1 is a schematic view of an arrangement for optically measuring an aspheric surface according to the present invention.

The aspheric surface optical testing device for testing an aspheric EUT in the transmission mode as depicted in FIG. 1 comprises a collimator for perfectly collimating a laser beam 10 from a laser source 11, and in combination with a liquid crystal container 30 which will be filled with an index matching liquid crystal 41 such as benzodioxan and sandwiched between a polarizer 21 and an analyzer 22. In between the laser 11 and the collimating lens 20, a small lens such as a microscope objective 12, focuses the laser beam 10 to a small pinhole 13, and the laser light emerging from the pinhole diverges until it reaches the collimating lens.

In further reference to FIG. 1 the collimator 20 comprises a cemented doublet combination of a plano-convex lens and a convexo-concave lens.

Figure 2:
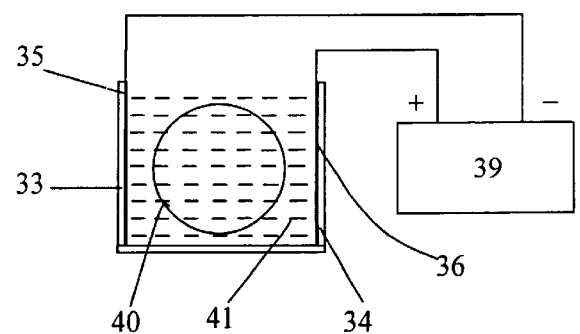
FIG. 2 is a transverse cross section showing the liquid crystal container with a DC power source.

The container 30 is made out of five glass plates cemented together. The front plate 31 and back plate 32 are precisely processed and polished. Their surface error and the parallelism error are made very small, and the flatness error is controlled typically to within $\lambda/15$ where $\lambda$ is the wavelength of the light beam concerned. The two side plates 33 and 34 are deposited with silver or other electrically conductive materials 35 and 36, so that a DC voltage source 39 can be used to apply typically 10 to 1000 volts across them as shown in FIG. 2. This DC voltage source 39 is supplied to help align the molecules of the liquid crystal 41 in a direction transverse to the direction of propagation of the plane wave. When the collimated light beam propagates through the liquid crystal container 30, as shown in FIG. 1, the light beam will be divided into an ordinary beam and an extraordinary beam owing to the alignment of the liquid crystal molecules. These two orthogonally-polarized beams will transit the EUT 40, emerge from the container 30, and interfere optically at the analyzer 22 The analyzer is an additional polarizer that has substantially the same characteristics as the polarizer 21. Interference fringe patterns that are formed after the analyzer 22 will be captured, processed, analyzed, and displayed appropriately. Since the aspheric EUT is in general not a uniaxial crystal, the interferogram will contain information on the surface topography of the aspheric profile.

The analyzer 22 is positioned adjacent to the container to single out the interference fringes formed by the aspheric EUT. For high fringe visibility, the analyzer 22 can be rotated slightly to image the interference fringes formed behind the plane of the analyzer 22 on to the CCD panel of the camera 51. The fringe pattern is subsequently analyzed by the computer 52. A monitor 53 will show the interference fringes, and the three-dimensional profile of the aspheric test surface after the data is processed.

The mathematical analysis is demonstrated as follows, according to the cylindrical coordinate system. Supposing the length of the container is L, the thickness of the EUT is $d(r,\theta)$ and the center thickness of it is $d_0$, the intensity obtained from the interference pattern for a phase difference of $\delta(r, \theta)$ is given by $$I(r,\theta)=I_1+I_2+2(I_1 I_2)^{1/2} \cos \delta(r,\theta) \qquad (1)$$

where $I_1$ and $I_2$ are the intensities of the ordinary and extraordinary components projected along the polarization axis of the analyzer 22; r and $\theta$ are two-dimensional spatial variables for radius and angle; $\delta(r, \theta)$ is the phase difference between $I_1$ and $I_2$, which can be expressed by $$\delta(r,\theta) = \frac{2\pi}{\lambda}[L - d(r,\theta)](n_e - n_o) \qquad (2)$$

In equation (2), the difference in the optical path length between the ordinary and extraordinary beams at point $(r, \theta)$ is expressed by $\Delta(r, \theta)=[L-d(r, \theta)](n_e-n_o)$. The optical path difference between the ordinary and extraordinary beams at the center of the EUT is $\Delta_o=(L-d_0)(n_e-n_o)$. Supposing that the order number of a fringe (the fringe order) in the interference fringe pattern, counting from the center of the aspheric EUT to the position $(r, \theta)$ is $m(r, \theta)$, then we can express the thickness function $d(r, \theta)$ as $$d(r,\theta) = \frac{m(r,\theta)\lambda}{(n_e - n_o)} + d_0 \qquad (3)$$

From equation (3), we see that the thickness function $d(r, \theta)$ can be determined by counting the interference fringes. The thickness difference determined by two neighboring fringes is $$\frac{\lambda}{n_e - n_o}.$$

By using the common Twyman-Green interferometer, however, the thickness differences determined by two neighboring fringes $$\frac{\lambda}{n-1},$$

is where n is the refractive index of the EUT. So, the testing range $$\frac{n-1}{n_e - n_o}$$

is times that available with the common interferometer. Supposing n=1.5 and $n_e-n_o$=0.02, the testing range would be raised by 25 times. Therefore, we can test large-slope aspheric elements with this method. The only other requirement is that the other surface profile of the EUT and the center thickness must be known first. Usually, these parameters of the EUT can be easily determined.

When one surface of the test element is a plane surface and the other is an aspheric surface, the aspheric surface can be expressed by $$Z(r,\theta) = \frac{m(r,\theta)\lambda}{(n_e - n_o)} \qquad (4)$$

When one surface of the test element is spherical, the aspheric surface can be represented by $$Z(r,\theta) = \frac{m(r,\theta)\lambda}{(n_e - n_o)} \pm \left(R_0 \sqrt{(R_0^2 - r^2)}\right) \qquad (5)$$

where $R_0$ is the radius of curvature of the spherical surface. If the spherical surface is concave, the sign in the above equation is plus, otherwise the sign is minus. After the interference fringe order from the center to the test point $(r, \theta)$ and the liquid crystal refractive indices $n_o$, $n_e$ are determined, the depths of a set of discrete points on the test surface can be obtained by using Eq. (4) or (5). Fitting the discrete points by Zernike polynomials or otherwise, the user can obtain the aspheric surface profile very precisely.

Figure 3:
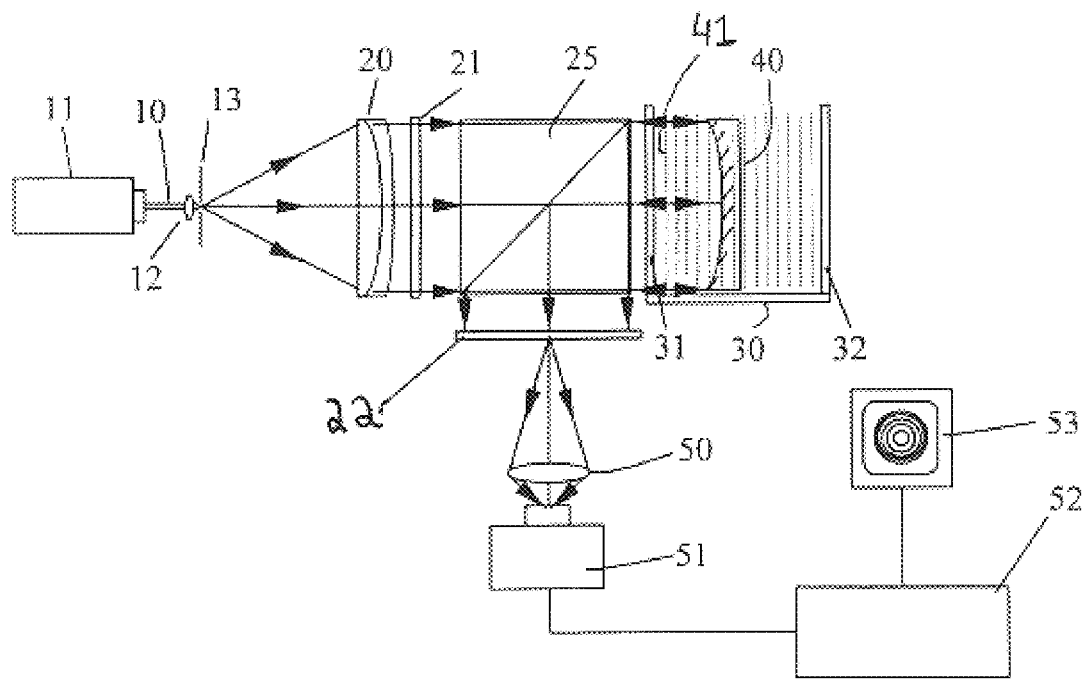
FIG. 3 is a schematic view of an arrangement for optically measuring a reflective aspheric surface according to the present invention.

For testing reflective aspheric surfaces, the schematic is depicted in FIG. 3. As in the foregoing descriptions of a scheme for testing transmissive aspheric element as mentioned above, the laser beam 10 is collimated by the collimating system 12, 13 and 20. It then propagates through polarizer 21 and a conventional cube beam splitter 25. Then it passes through the front glass plate 31 and the liquid crystal 41 and reaches the aspheric EUT 40. The reflected beam from the aspheric EUT contains the information of the aspheric surface under test. The cube beam splitter then directs the reflected beam onto an analyzer 22 to generate interference fringes. The interferogram localized behind analyzer 22 will be projected by the imaging lens 50 on the CCD panel of the camera 51 and processed by the computer 52. A monitor 53 will show the interference fringes and the three-dimensional profile of the aspheric test surface after data processing.

For testing aspheric surfaces in the reflection mode, the mathematical analysis is very simple. If the number of interference fringes at a test pont $(r, \theta)$ is $m(r, \theta)$, the depth of the test point can be expressed as $$Z(r,\theta) = \frac{m(r,\theta)\lambda}{2(n_e - n_o)}. \qquad (6)$$

After the depths of a set of discrete points on the aspheric surface are obtained from the above equation, fitting the discrete points by Zernike polynomials or otherwise will generate the profile of the aspheric surface under test in the reflection mode.

Figure 4:
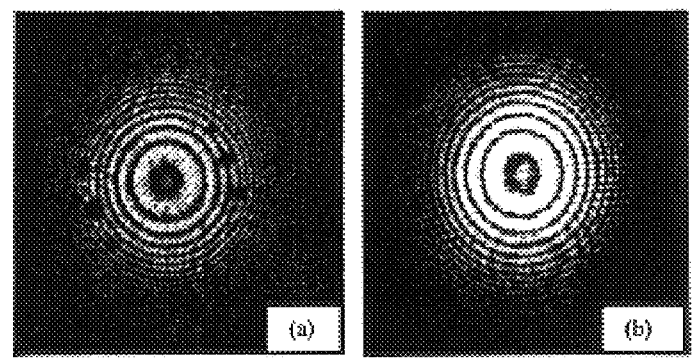
FIG. 4 illustrates pictorially the experimental results with a spheric EUT and an aspheric EUT.

FIG. 4(a) shows the interference fringes obtained experimentally from a spherical surface. FIG. 4(b) shows the interference fringe pattern obtained experimentally from an aspheric surface.

The above device is easy to construct and it also permits very precise measurements of the geometry of an aspheric surface to be performed without extensive calculations. While the above illustrative examples have been given by way of demonstration, those skilled in the art will recognize that they do not exhaustively define the spirit and scope of the present invention, which could be practiced in many other methods, and is limited only by the following claims.

What is claimed is:

1. A testing device for measuring surface topography of an optical element, comprising:

a container having at least one transparent window and including a liquid crystal, said container arranged to receive said optical element immersed in said liquid crystal;

an electric field source for aligning the molecules of said liquid crystal;

a source of coherent, polarized light having a collimated plane wave front arranged to illuminate said liquid crystal and said optical element through said transparent window;

an analyzer arranged to receive light which has interacted with the optical element emerging from said container and forming an interference pattern behind said analyzer;

a detector for detecting said interference pattern; and a computer for analyzing said detected interference pattern to compute surface topography of said optical element.

2. A testing device as specified in claim 1 wherein said source of coherent polarized light comprises a laser and an optical system including a collimator lens and a polarizer.

3. A testing device as specified in claim 2 wherein the polarizer is a linear polarizer.

4. A testing device as specified in claim 1 wherein the analyzer is a polarizer.

5. A testing device as specified in claim 4 wherein the polarizer is a linear polarizer.

6. The testing device as defined in claim 1 wherein said container includes two transparent windows each comprising an optical grade glass plate with said plates forming opposite walls of said container.

7. The testing device as defined in claim 1 wherein said quantity of liquid crystal comprises benzodioxan.

8. The testing device as defined in claim 1, wherein said electric field source comprises conductive walls of said container and a voltage source having a range of ten (10) to one-thousand (1000) volts.

9. The testing device as defined in claim 6 wherein said container comprises two transparent windows for passage of the polarized light, said transparent windows forming walls of the container, and wherein said transparent walls comprise glass plates which are precisely processed with small surface error, parallelism error, and flatness errors.

10. The optical container as defined in claim 6 wherein said container includes two glass plates comprising sidewalls deposited with an electrically conductive material for applying a direct current electric field between them.

11. A method for determining the topography of at least one surface of an optical element, comprising:

immersing said element in a liquid crystal;

providing an electric field in said liquid crystal to align the molecules thereof;

illuminating said surface with coherent, polarized light, having a collimated plane wave front, through said liquid crystal;

forming an interference pattern using said light that has passed through said liquid crystal and interacted with said optical element; and determining said surface topography from said interference pattern.

12. A method as specified in claim 11 for determining the topography of a reflecting surface of an optical element, wherein said interference pattern is formed using light reflected from said surface.

13. A method as specified in claim 11 for determining the topography of at least one surface of an optical element, wherein said interference pattern is formed said light that has passed through said liquid crystal element and said optical element.

14. A method as specified in claim 11 wherein said electric field is transverse to the propagation direction of said polarized light.

15. The method of claim 13 wherein said optical element comprises a lens.

* * * * *